F. MARTIN.
ROLLER BEARING FOR THE CAM DISKS OF CAM DISK GEARINGS.
APPLICATION FILED NOV. 19, 1920.
1,419,681.
Patented June 13, 1922.
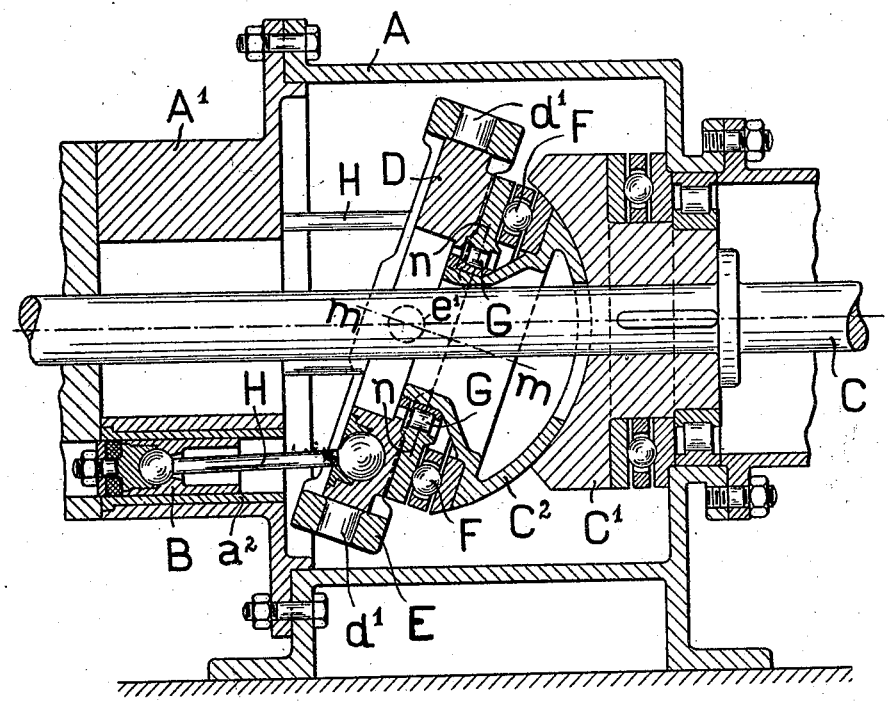
Inventor
Friedrich Martin,
By Knight & Bro.
attys.

UNITED STATES PATENT OFFICE.

FRIEDRICH MARTIN, OF ESSEN, GERMANY, ASSIGNOR TO FRIED. KRUPP AKTIEN-GESELLSCHAFT, OF ESSEN-ON-THE-RUHR, GERMANY.

ROLLER BEARING FOR THE CAM DISKS OF CAM-DISK GEARINGS.

1,419,681.     Specification of Letters Patent.    Patented June 13, 1922.

Application filed November 12, 1920. Serial No. 425,084.

(GRANTED UNDER THE PROVISIONS OF THE ACT OF MARCH 3, 1921, 41 STAT. L., 1313.)

*To all whom it may concern:*

Be it known that I, FRIEDRICH MARTIN, residing at Essen, Germany, a citizen of the German Republic, have invented a certain new and useful Improvement in Roller Bearings for the Cam Disks of Cam-Disk Gearings (for which I have filed an application in Germany Dec. 15, 1916), of which the following is a specification.

This invention relates to roller bearings for the cam disk of so-called cam disk gearings, that is to say, of gearings which effect a positive connection between a shaft and a piston guided parallel with the axis of the shaft in a cylindrical casing by means of a cam disk which is pivoted by a Cardan joint at a point on the axis of the shaft to a portion of the gearing which is connected to the cylindrical casing so as not to rotate. The cam disk can rotate about an axis which cuts the axis of the shaft at an oblique angle through the medium of bearing rollers (which may be spherically shaped or cylindrical), such rotation being relative to a bearing member which is arranged with respect to the cylindrical casing that one part can rotate relatively to the other about the axis of the shaft. The invention particularly refers to roller bearings for the cam disks of gearings of this kind, in which the cylindrical casing and the part of the gearing which is pivoted by a Cardan joint thereto are arranged stationarily and consequently the bearing member for the cam disk can be rotated about the axis of the shaft. In the known arrangement for the roller bearings for cam disk gears of the last mentioned kind it is not possible as experience has shown to get the bearing to work in a reliable manner, on the contrary even after working for a very short time the bearing is regularly destroyed. The object of this invention therefore is to provide for such cam disk gearings a roller bearing which will work with complete reliability.

In the accompanying drawing is shown a constructional example of the subject matter of the invention as applied to a liquid change speed gearing, which consists in the usual way of two cam disk gearings of the kind in question, one of which acts as a pump and the other as a hydraulic motor, and the drawing shows a vertical section through the cam disk gearing which acts as a pump.

A denotes the fixed or stationary casing of the cam disk gearing, to which is rigidly connected the cylindrical casing $A^1$ which contains a number of cylinders $a^2$. The cylinders $a^2$ in each of which is a piston B at equal distances from each other, are arranged with their axes parallel with the driving shaft C of the cam disk gear which shaft C is carried in the casing A. The annularly formed cam disk D is provided on its outer edge with two studs $d^1$, by means of which it is carried in a ring E, which in its turn is carried in the casing A by means of two coaxial studs $e^1$, the axis of which cuts the axis of the studs $d^1$ at a right angle. The cam disk D is therefore, as follows from the above description, pivoted by a Cardan joint to the casing A, and the central point of the Cardan joint formed by the point of intersection of the axes of the studs $d^1$ and $e^1$ lies in the axis of rotation of the shaft C. The cam disk D is also provided with a roller bearing G, the axis $m$—$m$ of which passing through the axis of rotation of the shaft C forms an oblique angle therewith. The roller bearing has a two part bearing member, which consists of a part $C^1$ rigidly connected to the shaft C and a part $C^2$ which is so adjustable relatively to the part $C^1$ that the angle which the axis $m$—$m$ of the roller bearing forms with the axis of rotation of the shaft C can be varied as may be desired within certain limits. Between the cam disk D and the part $C^2$ of the bearing member $C^1$, $C^2$ is arranged on the one hand a ring of balls F intended to take up axial pressure and on the other hand the ring of cylindrical rollers G before mentioned intended to take up radial pressure. Between the cam disk D and each of the pistons B is finally interposed a thrust bar H provided at each end with a ball pivot. So far the arrangement is broadly old and consequently does not form the subject matter of this invention.

According to this invention the apparatus is so constructed that the central plane of the bearing rollers G intended to take up the radial pressure, which plane contains the pressure center of the roller bearing and is denoted by the line n—n does not, as heretofore pass through the central point of the Cardan joint which connects the cam disc to the casing but on the contrary lies at a fixed distance from this point. By a suitable selection of this distance it is possible as experience has shown to ensure that the bearing shall work in a perfectly reliable manner without difficulty.

Claims:

1. A bearing for cam disk gearing comprising a casing, a cam disk, said cam disk being mounted by a Cardan suspension, a two-part bearing member for said cam disk rotatable relatively to said casing and radial rollers disposed between said cam disk and bearing member at a distance from the plane of the points of suspension of the Cardan joint, the axes of said radial rollers being parallel to the axis of their associated part of the bearing member.

2. A bearing for cam disk gearing comprising a casing, a cam disk, a Cardan suspension for mounting said cam disk in said casing, a shaft, a two-part bearing member, one part of said bearing member being rigidly connected to said shaft, the other part of said bearing member being adjustably secured to said fixed part whereby the central longitudinal axis of the movable part forms an oblique angle with the axis of rotation of said shaft, balls interposed between said cam disk and said bearing member for taking up axial pressure and rollers interposed between said cam disk and said bearing member for taking up radial pressure, the axis of rotation of said radial rollers being parallel to the axis of the movable part of said bearing member, the central plane of said rollers being spaced from the central point of said Cardan suspension.

3. A cam disk gearing comprising a stationary casing, a cam disk mounted on said casing by a Cardan suspension, a bearing member for said cam disk rotatable relatively to said casing, and radial pressure rollers interposed between said cam disk and bearing member allowing said bearing member to rotate relatively to said cam disk about an axis describing an oblique angle with the axis about which the rotation of said bearing member takes place relatively to said casing, the pressure center of said rollers being disposed at a distance away from the central point of said Cardan suspension.

4. A bearing for cam disk gearing comprising a casing, a cam disk, a Cardan suspension for mounting said cam disk within said casing, a shaft, a two-part bearing member, one section of said bearing member being rigidly connected to said shaft, the other part of said bearing member being adjustable with respect to said fixed part, balls interposed between said cam disk and the movable part of said bearing member for taking up axial pressure, and rollers interposed between said cam disk and the movable part of said bearing member, the axis of said rollers being disposed parallel with the axis of its associated bearing member, the central plane of said rollers being disposed at a distance away from the central point of said Cardan suspension.

The foregoing specification signed at Essen, Germany, this 20th day of August, 1920.

FRIEDRICH MARTIN.

In presence of—
HANS GOTTSMANN,
CARL MÜLLER.